United States Patent [19]

Martin

[11] 4,049,308
[45] Sept. 20, 1977

[54] SYNTHETIC FLANGED CARRIER ROLLER

[75] Inventor: Donald E. Martin, Waukesha, Wis.

[73] Assignee: Rexnord Inc., Milwaukee, Wis.

[21] Appl. No.: 634,705

[22] Filed: Nov. 24, 1975

[51] Int. Cl.² ............................................ B60B 17/00
[52] U.S. Cl. ........................................ 295/8; 295/50;
    301/63 PW; 16/107; 308/101
[58] Field of Search .................... 295/31 R, 35, 36 R,
    295/39, 43, 44, 41, 42, 49, 50, 1, 8, 11, 21, 34;
    308/20, 24, 101, 36.1; 301/131, 132, 134, 135,
    111, 122, 63 PW; 16/107

[56] References Cited
U.S. PATENT DOCUMENTS

| 565,243 | 8/1896 | Taylor | 295/35 |
|---|---|---|---|
| 955,227 | 4/1910 | Tanis | 295/31 R |
| 1,367,800 | 2/1921 | Carroll | 295/44 |
| 3,697,119 | 10/1972 | Van Wierst et al. | 295/44 |

FOREIGN PATENT DOCUMENTS

219,994 7/1961 Austria ................................. 308/20

Primary Examiner—Robert B. Reeves
Assistant Examiner—H. Grant Skaggs
Attorney, Agent, or Firm—Sughrue, Rothwell, Mion, Zinn and Macpeak

[57] ABSTRACT

A carrier roller comprising (1) an integral roller tire subassembly comprising a cylindrical bearing, two axial inserts, and a molded resilient roller tire and (2) an inner race. In one embodiment, the carrier roller further comprises (3) a roller bushing seal and (4) a labyrinth ring and may further comprise (5) a roller collar. A second embodiment may comprise only the basic components or may further comprise a roller collar. In both embodiments, the roller tire is preferably molded to include a guiding flange, and it is preferably molded from a synthetic material such as urethane.

19 Claims, 11 Drawing Figures

SYNTHETIC FLANGED CARRIER ROLLER

FIELD OF THE INVENTION

The invention pertains to carrier rollers such as are used as wheels for guiding and supporting chain-driven conveyor pans in industrial applications.

SUMMARY OF THE INVENTION

The invention is a carrier roller comprising (1) an integral roller tire subassembly comprising a cylindrical bearing, two axial inserts, and a molded resilient roller tire and (2) an inner race. In one embodiment, the carrier roller further comprises (3) a roller bushing seal and (4) a labyrinth ring and may further comprise (5) a roller collar. A second embodiment may comprise only the basic components or may further comprise a roller collar. In both embodiments, the roller tire is preferably molded to include a guiding flange, and it is preferably molded from a synthetic material such as urethane.

DETAILED DESCRIPTION OF THE PREFERRED EMBODIMENTS

THE FIGS. 1-9 EMBODIMENT

Figure 1:
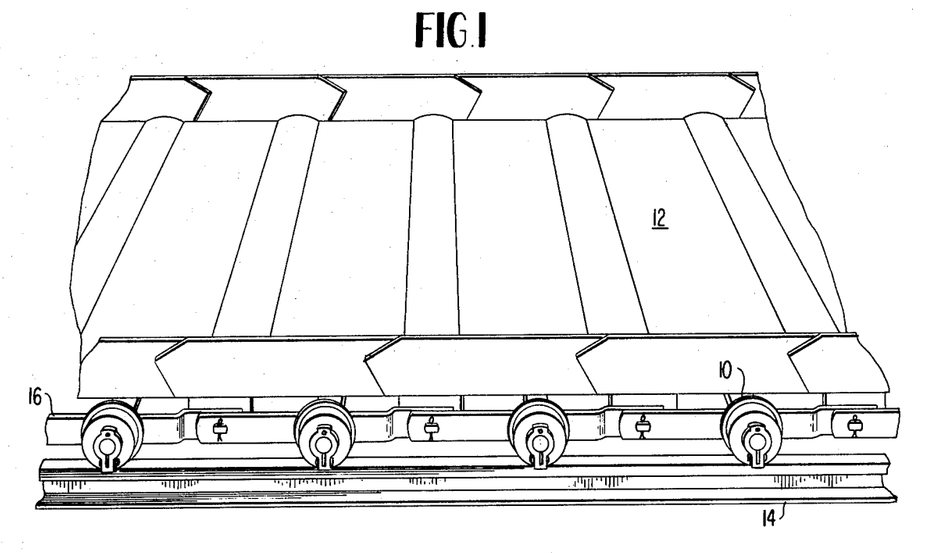
FIG. 1 is a perspective view of a first embodiment of the subject carrier rollers in a typical industrial application.

FIG. 1 shows a plurality of carrier rollers 10 being used to guide and support conveyor pans 12. The carrier rollers 10 are in turn supported by the track 14, and the conveyor pans are drawn along by the chain 16. Since arrangements of this sort are well known as, for instance, sugar cane carriers, the overall arrangement will not be further described.

Figure 2:
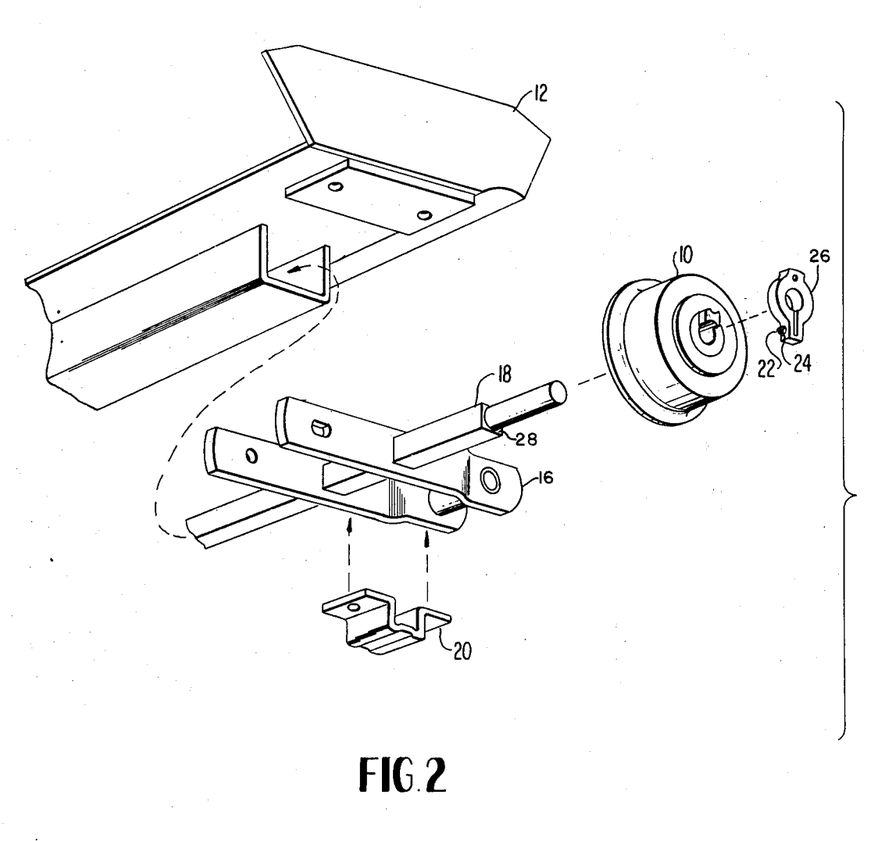
FIG. 2 is a partially exploded perspective view showing the mounting of the first embodiment of the subject carrier rollers on a chain-driven conveyor pan.
Figure 3:
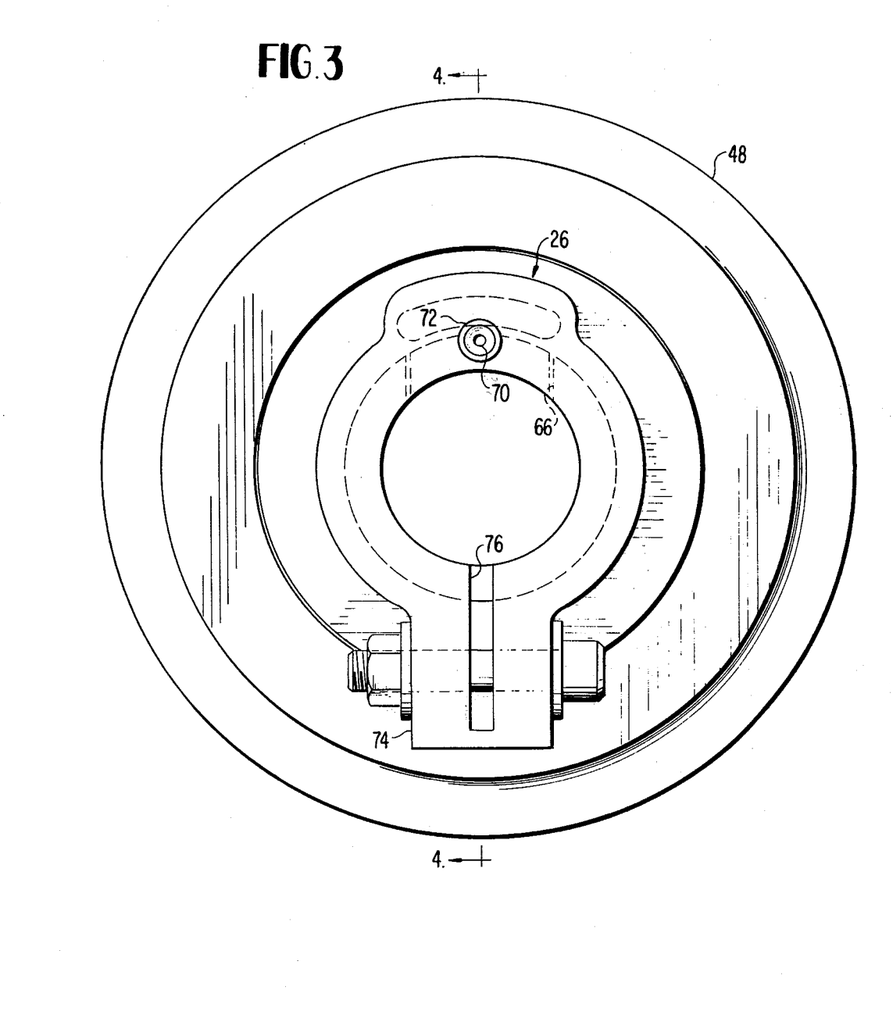
FIG. 3 is a plan view of the first embodiment of the subject carrier rollers.

FIG. 2 shows how each of the carrier rollers 10 is connected to one of the conveyor pans 12. In brief, a conveyor shaft 18, which also mounts a link of the chain 16 (shown here as doubled), is mounted on the bottom of the conveyor pan 12 by means of a clamp 20, and the carrier roller 10 is clamped on the outboard end of the shaft 18 by means of a bolt 22 and a nut 24 which coact to tighten a resilient roller collar 26 down on the shaft 18, thereby confining the carrier roller 10 between the roller collar 26 and a shoulder 28 on the shaft 18.

FIGS. 3-9 show a first preferred embodiment of the subject carrier roller in detail. As shown, the preferred embodiment comprises five components: (1) an integral roller tire subassembly 30, (2) a roller bushing seal 32, (3) an inner race 34, (4) a labyrinth ring 36, and (5) the previously mentioned roller collar 26. These separate elements will be described in turn.

The roller tire subassembly 30 comprises a cylindrical bearing 38, a left-hand axial labyrinth insert 40, a right-hand axial labyrinth insert 42, and a molded roller tire 44. The labyrinth insert 40 abuts a portion of the left-hand axial and outer radial (circumferential) faces of the cylindrical bearing 38, and the left-hand axial face of the labyrinth insert 40 is shaped to act as one portion of a labyrinth seal. The labyrinth insert 42 abuts a portion of the right-hand axial and outer radial faces of the cylindrical bearing 38, and the right-hand axial face of the labyrinth insert 42 is shaped to act as one portion of a labyrinth seal. The roller tire 44 abuts the remainder of the outer radial (circumferential) face of the cylindrical bearing 38, the remainder of the right-hand axial (circumferential) face and the radially outer face of the labyrinth insert 40, and the remainder of the left-hand axial face and the radially outer (circumferential) face of the labyrinth insert 42. Means are provided on the roller tire 44 and/or the labyrinth inserts 40 and 42 for preventing relative movement of the roller tire 44 and the labyrinth inserts 40 and 42. In the presently preferred embodiment, these means comprise four symmetrically disposed protuberances 46 on the labyrinth inserts 40 and 42 and corresponding dimples in the roller tire 44, but obviously the dimples and the protuberances could be reversed or other detent means used. Although the cylindrical bearing 38 can be positively and mechanically anchored in the roller tire 44, in practice it has been found that the molded-over relationship shown in the drawings provides adequate insurance against circumferential or radial slippage.

During fabrication of the roller tire subassembly 30, the cylindrical bearing 38 and the labyrinth inserts 40 and 42 are positioned in the desired abutting relationship, where they function as mold walls while the roller tire 44 is molded over and, to some extent, around them. This method of fabrication is particularly advantageous because it permits the outer surfaces of the roller tire 44 and the inner surface of the bearing 38 to be made closely concentric relatively easily and inexpensively, thereby minimizing the tendency of labyrinth eccentricity to cause "grease pumping" during use of the carrier roller, and because it eliminates damage to the bearings during conventional axial insertion into the roller tire and preload on the bearings from partial or total interference fits with the roller tire. Additionally, of course, it eliminates the need for separate machining of the interior surface of the roller tire 44 and assembly of the cylindrical bearing 42 within the roller tire 46.

The roller tire 44 is preferably molded from a somewhat resilient synthetic, such as urethane, while the labyrinth inserts 40 and 42 are preferably fabricated from a somewhat less resilient synthetic, such as Zytel. The cylindrical bearing 38 can be any suitable commercially made bearings, INA bearing No. 53216 having been found satisfactory for this purpose.

For the use shown in FIG. 1, the roller tire subassembly 30 preferably comprises a guiding flange 48 constituted by a radial extension of the right-hand portion of the roller tire 44. While unnecessary in most applications the roller tire subassembly 30 may also comprise axial thrust washers (not shown) mounted on the radially inner portion of the axially outer faces of the labyrinth inserts 40 and 42.

The left-hand portion of the roller bushing seal 32 is sized to fit within the inner race 34; the right-hand portion extends radially outwards beyond the inner race 34, and the axially inner face of the right-hand portion of the roller bushing seal 32 is shaped to complement the right-hand axial face of the labyrinth insert 42 and to act as the second portion of a labyrinth seal. The roller bushing seal 32 has an axial opening 50 sized to accept a mounting member (such as shaft 18 or a chain pin) and a through-greasing passage 52 extending from its left-hand axial face to a point short of its right-hand axial face, at which point the through-greasing passage 52 communicates with the radially outer (circumferential) face of the roller bushing seal 32. While the axial opening 50 and the outer end of the shaft 18 are shown as cylindrical, obviously they need not be, and, while the through-greasing passage 52 is shown as a groove on the surface of the roller bushing seal 32, obviously it could also be a hole surrounded by the roller bushing seal 32. The roller bushing seal 32 is preferably made thick enough radially so that the dimensions of the axial opening 50 can be varied, allowing an otherwise standard carrier roller 10 to be used on a variety of different shafts or chain pins. Means are provided on the roller bushing seal 32 and/or the inner race 34 for preventing relative rotation of the roller bushing seal 32 and the inner race 34. In the presently preferred embodiment, these means comprise a protuberance 54 on the roller bushing seal 32, the radial thickness of the protuberance 54 being just less than the radial thickness of the inner race 34 in order to avoid any possible interference with the cylindrical bearing 38, and a corresponding notch 56 in the inner race 34, but obviously the protuberance and the notch could be reversed or other detent means used.

The inner race 34 is mounted on the radially outer (circumferential) face of the left-hand portion of the roller bushing seal 32 in a position to cooperate with the cylindrical bearing 38. It has a through-greasing passage 58 which is positioned to cooperate with the through-greasing passage 52 in the roller bushing seal 32. The inner race 34 is preferably press fit on the roller bushing seal 32 so that the two parts constitute an integral subassembly, and it is preferably made from carburized steel.

The labyrinth ring 36 has an axial opening defining a radially inner face which abuts at least a portion of the radially outer (circumferentialy) surface of the left-hand portion of the roller bushing seal 32. Its right-hand radially inner face abuts the left-hand axial face of the inner race 34, nd its right-hand radially outer face is shaped to complement the left-hand axial face of the labyrinth insert 40 and to act as the second portion of a labyrinth seal. The labyrinth ring 36 is preferably fabricated from a relatively non-resilient synthetic material, such as Zytel.

Finally, the presently preferred embodiment (which is adapted to serve as an outboard roller) comprises the roller collar 26 the right-hand axial face of which abuts the left-hand axial faces of the labyrinth ring 36 and the roller bushing seal 32. The roller collar 26 has an axial opening 60 which constitutes a continuation of the axial opening 50 in the roller bushing seal 32, and means are provided on the roller collar 26 and/or the labyrinth ring 26 and on the roller collar 26 and/or the roller bushing seal 32 to prevent relative rotation between the roller collar 26 and the labyrinth ring 36 and between the roller collar 26 and the roller bushing seal 32, respectively. In the presently preferred embodiment, the former means comprise a dimple 62 in the labyrinth ring 36 and a corresponding protuberance 64 on the roller collar 26, and the latter means comprise a notch 66 (best seen in FIG. 9) in the roller collar 26 and a corresponding protuberance 68 on the roller bushing seal 32, but obviously the dimple and the protuberance and/or the notch and the protuberance could be reversed or other detent means used, including a detent means connecting the labyrinth ring 26 to the roller bushing seal 32.

Figures 5, 6, 7, 9:
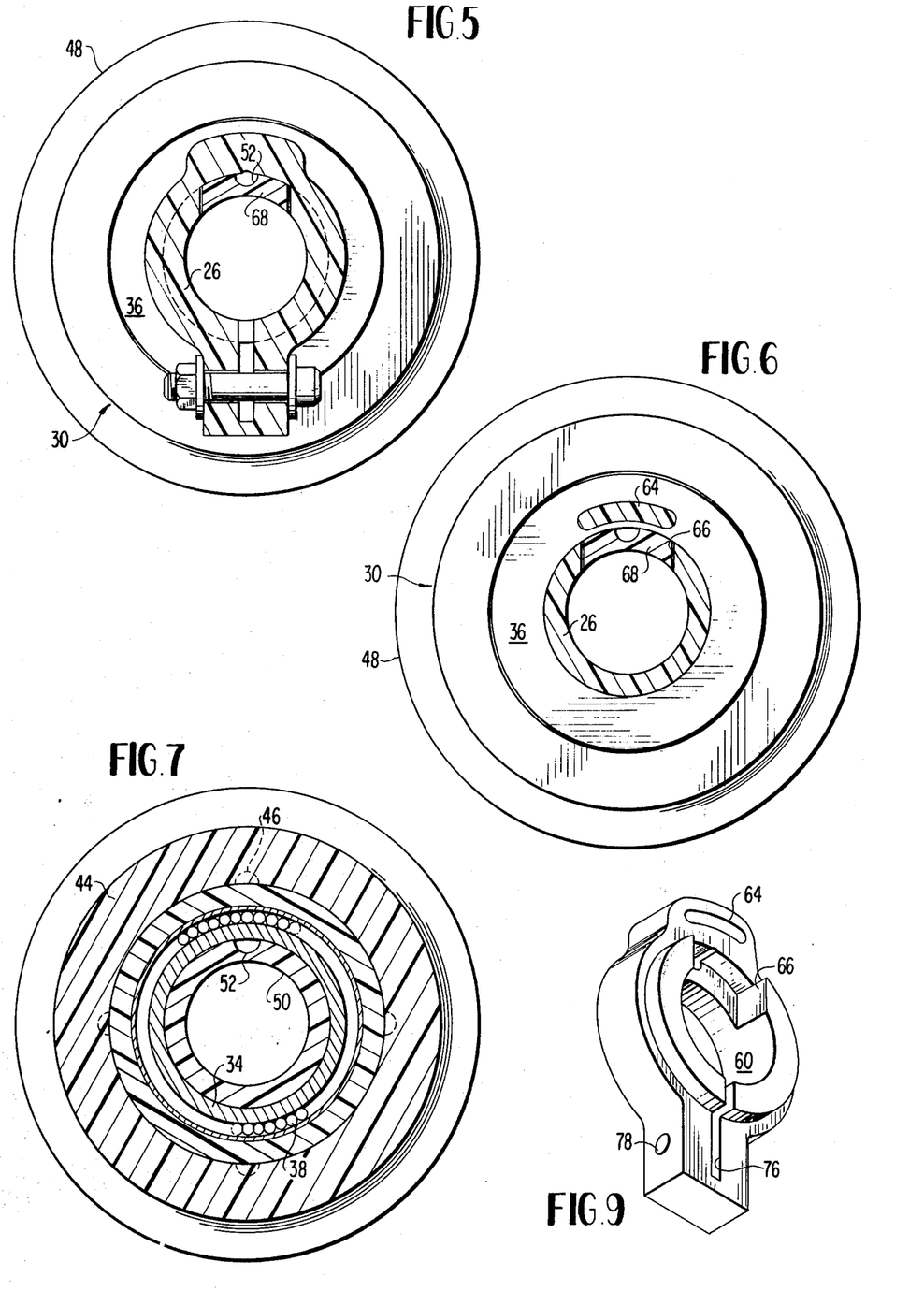
FIG. 5 is a view along the lines 5—5 in FIG. 4.
FIG. 6 is a view along the lines 6—6 of FIG. 4.
FIG. 7 is a view along the lines 7—7 of FIG. 4.
FIG. 9 is a perspective view of a roller collar which may be used with the first embodiment of the subject carrier roller.
Figure 8:
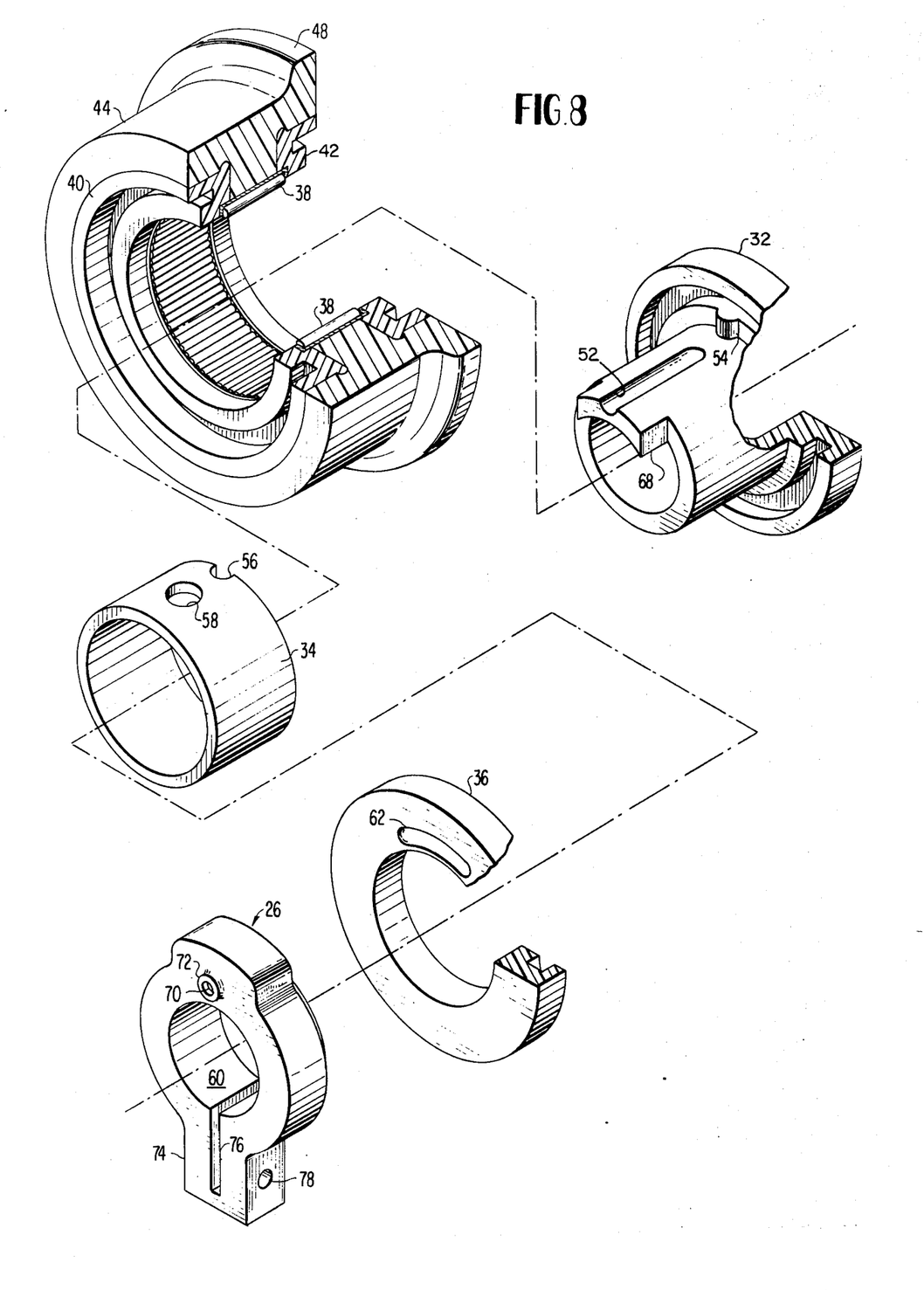
FIG. 8 is a partially exploded perspective view of the first embodiment of the subject carrier rollers.

The roller collar 26 has a through-greasing passage 70 extending from the left-hand face of the roller collar 26 to a point where it communicates with the right-hand end of the through-greasing passage 52 in the roller bushing seal 32. A collar 72 is provided around the left-hand end of the through-greasing passage 70 to simulate a button-head fitting, thereby facilitating emplacement of a greasing gun in proper position to send grease into the through-greasing passage 70.

The roller collar 26 further comprises means previously briefly described for locking the surface of the axial opening 60 tightly on a shaft or chain pin so as to prevent rotation of the roller collar 26 about the shaft or chain pin. In the presently preferred embodiment, these means comprise a lug 74 extending radially outward from the adjoining outer surface of the roller collar 26, a radial slot 76 which extends from the left-hand to the right-hand face of the roller collar 26 and from the axial opening 60 through the lug 74 to a point close enough to the surface of the lug 74 to permit the sides of the lug 74 defined by the slot 76 to be drawn together by a compressive force perpendicular to the slot 76, and means for applying a compressive force perpendicular to the slot 76 to the sides of the lug 74 defined by the slot 76. The slot 76 permits a maximum clamping force by the roller collar 26 on the shaft 18 while imposing minimum internal stresses on the roller collar 26 where the lug 74 blends into the remainder of the roller collar 26. In the presently preferred embodiment, those means comprise a hole 78 extending through the lug 74 and the slot 76 in the direction perpendicular to the slot, the previously mentioned bolt 22 passing through the hole 78, and the previously mentioned nut 24 mounted on the bolt 22. The locking means can be used to lock the roller collar 26 at any angular position on the shaft 18 if it is round in cross section or at a plurality of different positions if it is a regular polygon in cross section. This flexibility permits the exterior opening of the through-greasing passage 70 to be positioned at different heights relative to the axis of the carrier roller, thereby facilitating relubrication by automatic machinery while the roller is turning.

Figure 4:
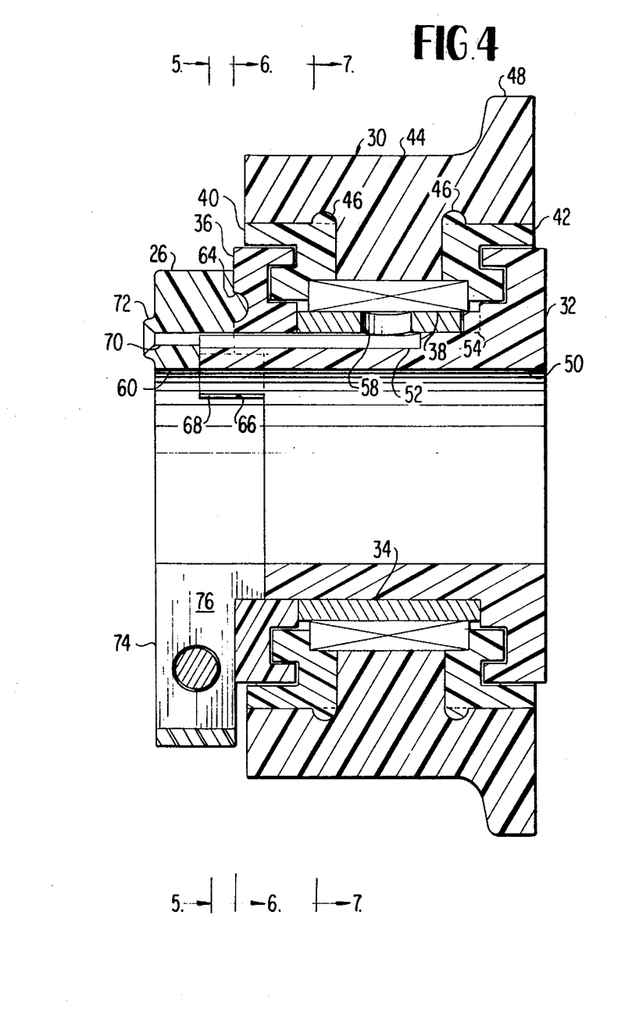
FIG. 4 is a cross-sectional view of the carrier roller shown in FIG. 3.

Preferably the clearance between the left-hand axial face of the labyrinth insert 40 and the right-hand radially outer (circumferential) face of the labyrinth ring 36 and the clearance between the right-hand axial face of the labyrinth insert 42 and the axially inner face of the right-hand portion of the roller bushing seal 32 increase in the radial direction. These clearances constitute labyrinth seals, and the reason that the thickness of the clearances preferably increase in the radial direction is so that when an axial force is placed on the carrier roller, as by a misalignment of the track 14 resulting is untoward pressure on the flange 48 and undesired contact between the labyrinth inserts and the two parts with which they cooperate to form labyrinth seals, the outer parts of the labyrinth seals, which is where contaminants can enter the system, will remain open and greased. In the presently preferred embodiment, as best seen in FIG. 4, the labyrinth seals are made in the form of three axially concentric surfaces on each of the abutting parts joined by two annular surfaces which are perpendicular to the axis of the carrier roller, and the desired effect is achieved by designing the annular space between the outer annular surfaces to be 0.005 inch wider than the annular space between the inner annular surfaces.

The carrier roller shown in FIGS. 1-9 is primarily intended for outboard use, but it may be readily modified for inboard (i.e., between chain sidebars) use. When so used, the roller collar 26 is omitted (since the chain sidebar provides one axial limitation for the carrier roller), the roller bushing seal 32 is shortened (since it does not have to extend to abut the roller collar 26), and a circular dowel in the greasing passage (or equivalent detent means) locks the roller bushing seal 32 to the labyrinth ring 36.

Figure 10:
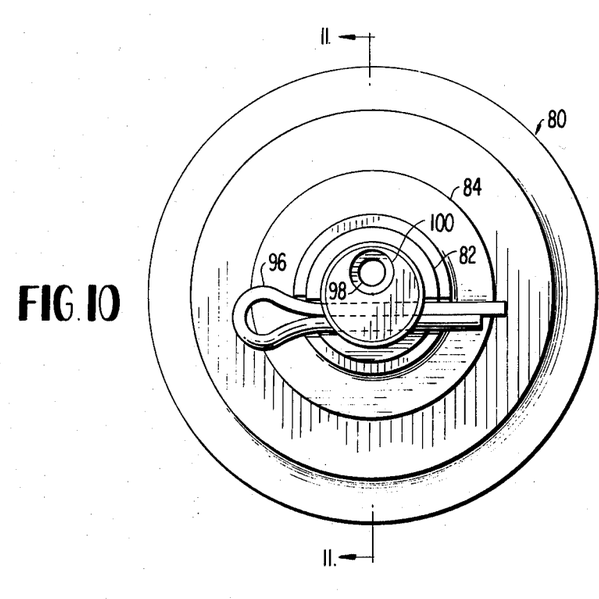
FIG. 10 is a plan view of a second embodiment of the subject carrier rollers.
Figure 11:
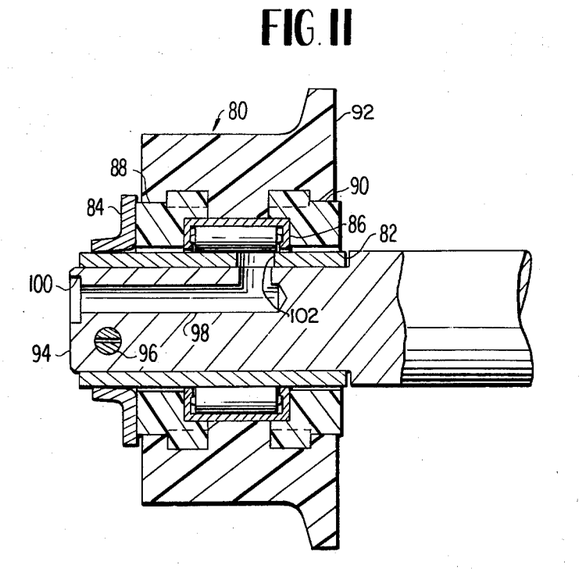
FIG. 11 is a cross-sectional view of the carrier roller shown in FIG. 10.

THE FIGS. 10 AND 11 EMBODIMENT

FIGS. 10 and 11 show a second embodiment of the subject invention. This embodiment is much simpler in construction in that it omits the parts necessary to provide labyrinth seals, but it shares the common feature that a roller tire is molded directly over a cylindrical bearing and two axial inserts, thereby providing the same advantages as were previously listed for the first embodiment disclosed. Since the two embodiments are so similar, description of similar features in the second embodiment will be omitted.

The roller collar shown in FIGS. 10 and 11, which is also adapted for outboard use, comprises (1) an integral roller tire subassembly 80, (2) an inner race 82, and (3) a roller collar 84, each of which will be described in turn.

The roller tire subassembly 80 comprises a cylindrical bearing 86, a left-hand axial insert 88, a right-hand axial insert 90, and a molded roller tire 92. The axial insert 88 abuts a portion of the left-hand axial and outer radial (circumferential) faces of the cylindrical bearing 86, and the axial insert 90 abuts a portion of the right-hand axial and outer radial (circumferential) faces of the cylindrical bearing 86. The roller tire 92 abuts the remainder of the outer radial (circumferential) face of the cylindrical bearing 86, the remainder of the right-hand axial (circumferential) face and the radially outer face of the axial insert 88, and the remainder of the left-hand axial face and the radially outer (circumferential) face of the axial insert 90. Means are provided on the roller tire 92 and/or the axial inserts 88 and 90 for preventing relative rotation of the roller tire 92 and the axial inserts 88 and 90. In the presently preferred embodiment, these means comprise four symmetrically spaced protuberances on the labyrinth inserts 88 and 90 and corresponding dimples in the roller tire 92, but obviously the dimples and the protuberances could be reversed or other detent means used.

In this embodiment, the inner race 82 extends clear through the carrier roller. On the inboard side, which is to the right in FIG. 11, it preferably extends slightly past the axial insert 82 to provide a shoulder which may be used to limit axial movement of the carrier roller on the shaft 94 in the right-hand direction. On the outboard side, which is to the left in FIG. 11, it preferably extends well beyond the axial insert 88 to cooperate with the roller collar 84 — although alternatively the inner race 82 could stop just barely outboard of the axial insert 88, the roller collar could encircle the shaft 94 directly, and the abutting relationship of the right-hand side of the roller collar 84 and the left-hand face of the inner race 82 could be used to limit axial movement of the carrier roller on the shaft 94 in the left-hand direction.

The roller collar 84 used with this embodiment is a simple flanged collar having two holes therein to receive a cotter pin 96. Corresponding holes are provided in the shaft 94 and the inner race 82, and the cotter pin 96 serves to prevent rotational and axial movement between the shaft 94 and the inner race 82 and between the inner race 82 and the roller collar 84, as well as indirectly serving to prevent relative axial movement between the shaft 94 and the carrier roller.

In this embodiment, a through-greasing passage 98 is provided directly in the shaft 94. The through-greasing passage 98 has a countersink 100 at the outboard end to facilitate the positioning of a grease gun, extends into the shaft to a point directly beneath the cylindrical bearing 86, and comes to the surface of the shaft 94 at that point. The inner race 82 has a corresponding through-greasing passage 102, the registry of which with the inboard end of the through-greasing passage 98 is maintained by the cotter pin 96, permitting the cylindrical bearing 86 to be greased. From the cylindrical bearing 86, the grease then works its way between the radially inner surfaces of the axial inserts 88 and 90 and the radially outer (circumferential) surface of the inner race 82, protecting the cylindrical bearing 86 from external contaminants.

While the carrier roller shown in FIGS. 10 and 11 is adapted for outboard use, like the carrier roller shown in FIGS. 1-9, it could be easily adapted for inboard use. When so used, the roller collar would be omitted, the inner race shortened, and other detent means provided for maintaining the through-greasing passage in the inner race in circumferential registry with the through-greasing passage in the shaft.

CAVEAT

While the present invention has been illustrated by a detailed description of two preferred embodiments thereof, it will be obvious to those skilled in the art that various changes in form and detail can be made therein without departing from the true scope of the invention. For that reason, the invention must be measured by the claims appended hereto and not by the foregoing preferred embodiments. Moreover, it should be noted that the terms "right-hand" and "left-hand" are used throughout the specification, including the claims, in a purely illustrative manner to aid in reference to the drawings, and this is not to imply that simple mirror images of the illustrated embodiments are outside the scope of the claims.

What is claimed is:

1. A carrier roller comprising an integral roller tire subassembly, said integral roller tire subassembly comprising:
   a. a bearing;
   b. a left-hand axial insert abutting a portion of the left-hand axial face and the outer radial (circumferential) face of said bearing, having an axial opening therein, and made from a synthetic material which is resilient relative to said bearing;
   c. a right-hand axial insert abutting a portion of the right-hand axial face and the outer radial (circumferential) face of said bearing, having an axial opening therein, and made from a synthetic material which is resilient relative to said bearing;

d. a roller tire made from a moldable material which is resilient relative to said bearing and said inserts, said roller tire abutting the remainder of the outer radial (circumferential) face of said bearing, the remainder of the right-hand axial face and the radially outer (circumferential) face of said left-hand axial insert, and the remainder of the left-hand axial face and the radially outer (circumferential) face of said right-hand axial insert, whereby said roller tire is molded around said inserts and said bearing, said inserts hold said bearing in position in the assembled carrier roller, and the relative resiliency of said roller tire prevents overload on and consequent damage to said bearing both from initial assembly and shock loads during use;

e. means for preventing relative movement of said molded roller tire and said left-hand axial insert; and f. means for preventing relative movement of said molded roller tire and said right-hand axial insert.

2. A carrier roller as claimed in claim 1 and further comprising:
   a. an inner race
      i. the radially outer surface of which is sized to fit within said bearing and
      ii. having a through-greasing passage therethrough and
   b. means for maintaining one end of said through-greasing passage in registry with said bearing.

3. A carrier roller as recited in claim 1 and further comprising a roller collar the right-hand axial face of which abuts the left-hand axial face of said axial insert, thereby limiting left-hand axial movement of said roller tire subassembly.

4. A carrier roller as recited in claim 1 and further comprising a roller collar which limits left-hand axial movement of said roller tire subassembly.

5. A carrier roller as recited in claim 1 wherein said means for preventing relative movement of said roller tire and said left-hand axial insert comprise a dimple and a corresponding protuberance, one of which forms a part of said roller tire and one of which forms a part of said left-hand axial insert.

6. A carrier roller as recited in claim 1 wherein said means for preventing relative movement of said roller tire and said right-hand axial insert comprise a dimple and a corresponding protuberance, one of which forms a part of said roller tire and one of which forms a part of said right-hand axial insert.

7. A carrier roller as recited in claim 1 wherein the right-hand portion of said roller tire extends radially outwardly beyond the left-hand portion to constitute a guiding flange.

8. A carrier roller comprising:
   a. a bearing;
   b. a left-hand axial insert
      i. abutting a portion of the left-hand axial face and the outer radial (circumferential) face of said bearing,
      ii. having an axial opening therein,
      iii. the left-hand axial face of which is shaped to act as one portion of a labyrinth seal, and
      iv. made from a synthetic material which is resilient relative to said bearing;
   c. a right-hand axial insert
      i. abutting a portion of the right-hand axial face and the outer radial (circumferential) face of said bearing,
      ii. having an axial opening therein,
      iii. the right-hand axial face of which is shaped to act as one portion of a labyrinth seal, and
      iv. made from synthetic material which is resilient relative to said bearing;
   d. a roller tire made from a moldable material which is resilient relative to said bearing and said inserts, said roller tire abutting the remainder of the outer radial (circumferential) face of said bearing, the remainder of the right-hand axial face and the radially outer (circumferential) face of said left-hand axial insert, and the remainder of the left-hand axial face and the radially outer (circumferential) face of said right-hand axial insert, whereby said roller tire is molded around said inserts and said bearings, said inserts hold said bearing in position in the assembled carrier roller, and the relative resiliency of said roller tire prevents overload on and consequent damage to said bearing both from initial assembly and shock loads during use;
   e. means for preventing relative movement of said roller tire and said left-hand axial insert;
   f. means for preventing relative movement of said roller tire and said right-hand axial insert;
   g. a roller bushing seal
      i. the left-hand portion of which is sized to fit within an inner race to be recited hereinafter,
      ii. having an axial opening sized to accept a mounting member,
      iii. the right-hand portion of which extends radially outwards beyond said bearing, the axially inner face of said right-hand portion being shaped to complement the radially inner portion of the right-hand axial face of said right-hand axial insert and to act as the second portion of a labyrinth seal, and
      iv. having a through-greasing passage extending from its left-hand axial face to a point short of its right-hand axial face, at which point the through-greasing passage communicates with the radially outer face of said roller bushing seal;
   h. an inner race
      i. mounted on the radially outer face of the left-hand portion of said roller bushing seal,
      ii. positioned to cooperate with said bearing, and
      iii. having a through-greasing passage positioned to cooperate with the through-greasing passage in said roller bushing seal; and
   i. a labyrinth ring
      i. having an axial opening defining a radially inner face which abuts at least a portion of the radially outer (circumferential) surface of the left-hand portion of said roller bushing seal,
      ii. the right-hand radially inner face of which abuts the left-hand axial face of said inner race, and
      iii. the right-hand radially outer face of which is shaped to complement the left-hand axial face of said left-hand axial insert and to act as the second portion of a labyrinth seal.

9. A carrier roller as recited in claim 8 wherein said means for preventing relative movement of said roller tire and said left-hand axial insert comprise a dimple and a corresponding protuberance, one of which forms a part of said roller tire and one of which forms a part of said left-hand axial insert.

10. A carrier roller as recited in claim 8 wherein said means for preventing relative movement of said roller tire and said right-hand axial insert comprise a dimple and a corresponding protuberance, one of which forms a part of said roller tire and one of which forms a part of said right-hand axial insert.

11. A carrier roller as recited in claim 8 wherein the right-hand portion of said roller tire extends radially outwardly beyond the left-hand portion to constitute a guiding flange.

12. A carrier roller as recited in claim 8 and further comprising a roller collar:
  i. the right-hand axial face of which abuts the left-hand axial faces of said labyrinth ring and said roller bushing seal;
  ii. having an axial opening constituting a continuation of the axial opening in said roller bushing seal;
  iii. comprising means for locking the surface of said axial opening tightly upon a mounting member pin so as to prevent rotation of said roller collar about the mounting member;
  iv. comprising means for preventing relative rotation of said roller collar and said labyrinth ring;
  v. comprising means for preventing relative rotation of said roller collar and said roller bushing seal; and
  vi. having a through-greasing passage extending from the left-hand face thereof to a point where it communicates with the left-hand end of the through-greasing passage in said roller bushing seal.

13. A carrier roller as recited in claim 12 wherein said means for locking the surface of the axial opening in said roller collar tightly upon a mounting member comprise:
  a. a lug extending radially outwards from the adjoining outer surface of said roller collar;
  b. a radial slot which extends from the left-hand to the right-hand face of said roller collar and from the axial opening, through said lug, to a point close enough to the surface of said lug to permit the sides of said lug defined by said slot to be drawn together by a compression force perpendicular to said slot, and
  c. means for applying a compression force perpendicular to said slot to the sides of said lug defined by said slot.

14. A carrier roller as recited in claim 13 wherein said means for applying a compression force comprise:
  a. a hole extending through said lug and said slot in the direction perpendicular to said slot;
  b. a bolt passing through said hole; and
  c. a nut mounted on said bolt.

15. A carrier roller as recited in claim 12 wherein said means for preventing relative rotation of said roller collar and said labyrinth ring comprise a dimple and a corresponding protuberance, one of which forms a part of said roller collar and one of which forms a part of said labyrinth ring.

16. A carrier roller as recited in claim 12 wherein said means for preventing relative rotation of said roller collar and said roller bushing seal comprise a notch and a corresponding protuberance, one of which forms a part of said roller collar and one of which forms a part of said roller bushing seal.

17. A carrier roller as recited in claim 8 wherein the clearance between the left-hand axial face of said left-hand axial insert and the right-hand axial face of said labyrinth ring increases in the radial direction.

18. A carrier roller as recited in claim 8 wherein the clearance between the right-hand axial face of said right-hand axial insert and the axially inner face of the right-hand portion of said roller bushing seal increases in the radial direction.

19. A carrier roller as recited in claim 8 and further comprising means for preventing relative rotational movement between said roller bushing seal and said inner race.

* * * * *